United States Patent [19]

Bien et al.

[11] Patent Number: 5,061,108
[45] Date of Patent: Oct. 29, 1991

[54] ATTACHING ARRANGEMENT FOR VEHICLE PLASTIC PANEL

[75] Inventors: Alfred A. Bien, Bloomfield; Gerald T. Niemitalo, Warren; Russell A. Simms, Orion; Robert L. Stewart, Rochester Hills; Riad E. Michael, Mount Clemens; Alfred W. Christenson, Rochester; Herbert J. Keller, Jr., Utica, all of Mich.

[73] Assignee: Chrysler Corporation, Highland Park, Mich.

[21] Appl. No.: 632,832

[22] Filed: Dec. 24, 1990

[51] Int. Cl.$^5$ ............................................. F16D 1/00
[52] U.S. Cl. .................................... 403/24; 403/331; 403/353
[58] Field of Search .................... 403/353, 331, 407.1, 403/24

[56] References Cited

U.S. PATENT DOCUMENTS

| | | | |
|---|---|---|---|
| 3,894,377 | 7/1975 | Welch | 403/353 X |
| 4,496,260 | 1/1985 | Brunn | 403/353 X |
| 4,754,943 | 7/1988 | Froutzis | 403/331 |
| 4,779,686 | 10/1988 | Ryan | 403/353 X |
| 4,881,844 | 11/1989 | Tremblay | 403/353 X |

Primary Examiner—Andrew V. Kundrat
Attorney, Agent, or Firm—Edward P. Barthel

[57] ABSTRACT

The present invention provides an arrangement for attaching a flexible elastomeric panel integrally formed with one or more female connectors to an automotive body support surface having one or more associated male connectors in a blind assembly connection. Each female connector comprises a cutting-tooth shaped notch molded in an attaching flange of the panel while the male connector comprises a elongated stem projecting from the support surface. The elongated stem includes a backing plate positioned in parallel spaced relation to the support surface defining a layered gap therebetween. The panel flange is moved into flush contact with the support surface enabling the support flange to be received in a layer-like gap with the stem adapted to be received in a lean-in passage of the female connector. As a result the blind assembly connection is permitted upon the panel being slid relative to the support surface in a self guided manner whereby the stem is cammed into a retaining groove portion of the notch in a resilient snap-in manner.

4 Claims, 3 Drawing Sheets

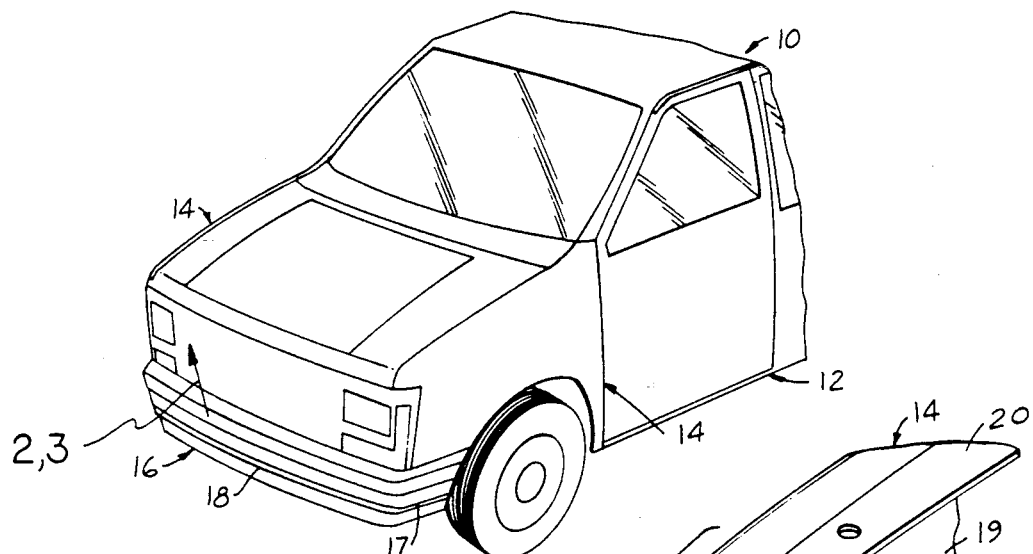
FIG. 1
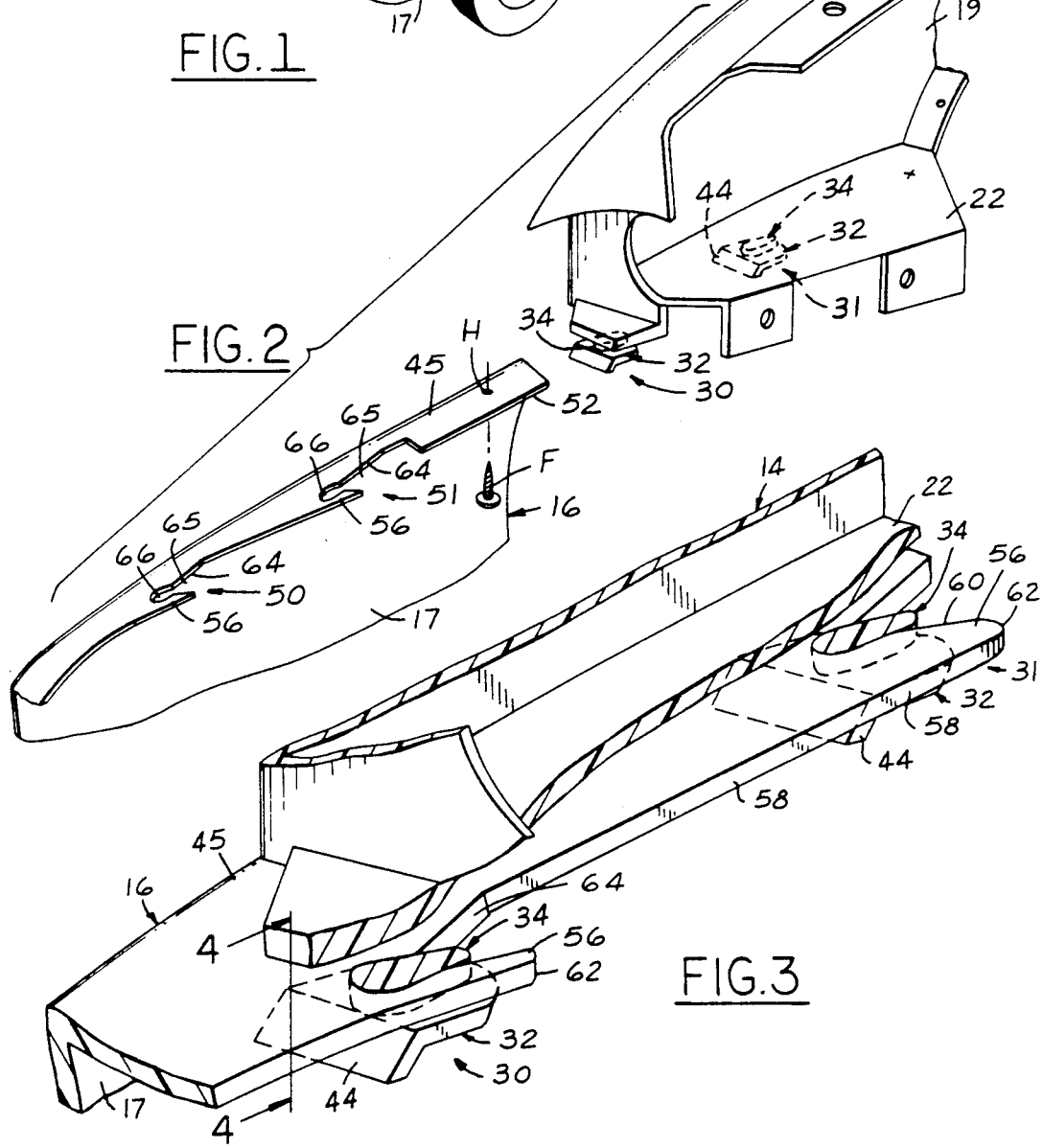
FIG. 2
FIG. 3

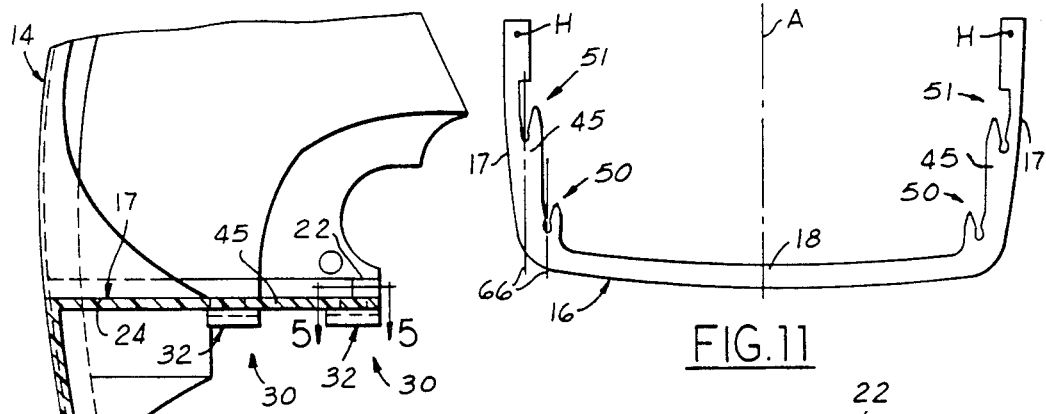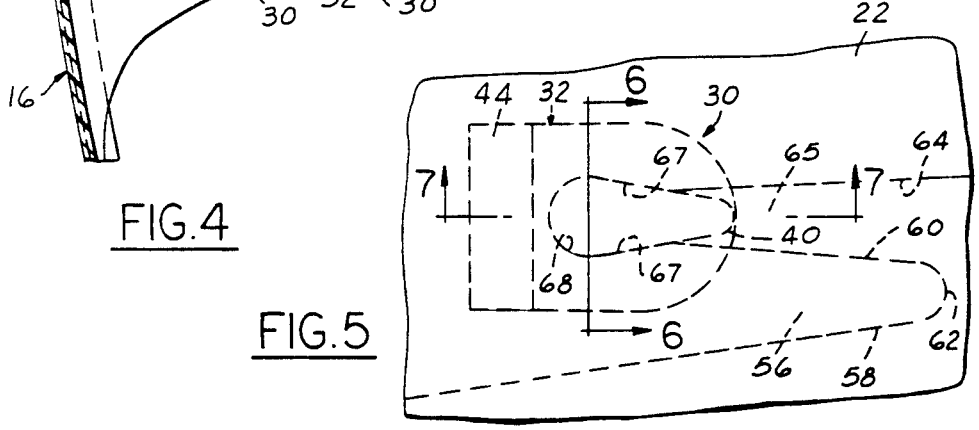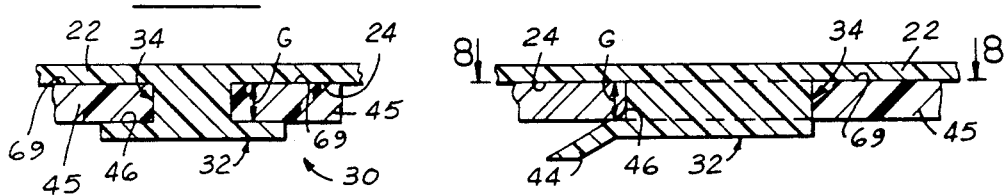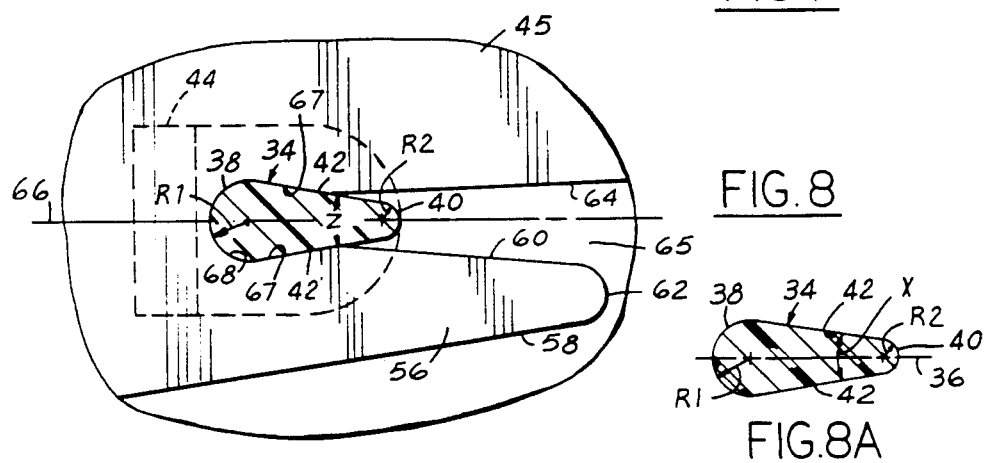

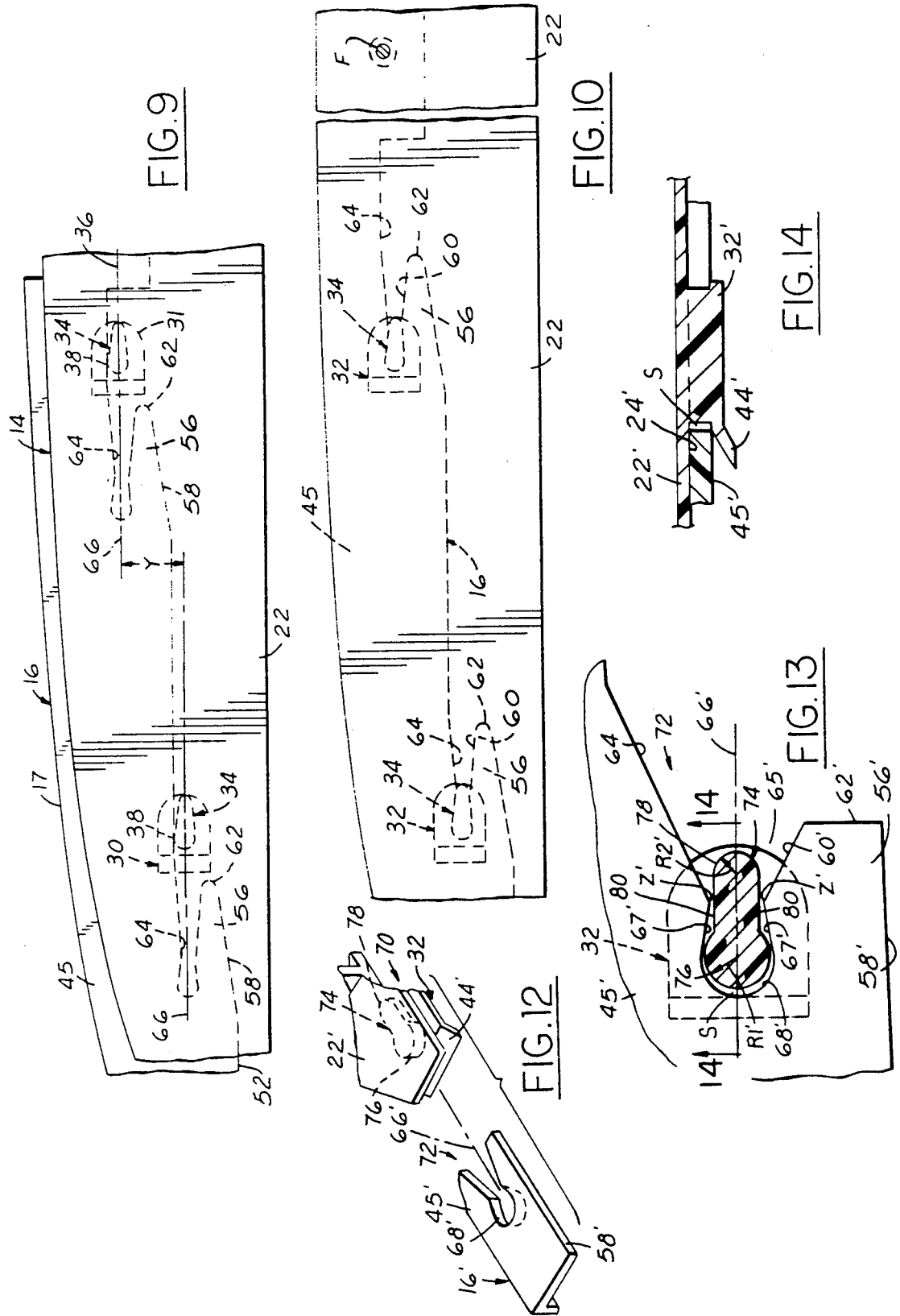

ATTACHING ARRANGEMENT FOR VEHICLE PLASTIC PANEL

This invention relates generally to an arrangement for attaching a flexible elastomeric panel to a plastic support surface of an automotive vehicle body and more particularly to such an attaching arrangement which provides a blind flush connection between a female connector formed integral with the panel and a male connector projecting from the support surface.

BACKGROUND OF THE INVENTION

Various arrangements have heretofore been used for securing flexible elastomeric panels to a connector member. One arrangement for securing a plastic male element to a plastic female element is found in the U.S. Pat. No. 3,626,429 issued Dec. 7, 1969 to Ells I. Toder entitled Detachable Drapery Carrier. The '429 patent discloses a two part detachable drapery carrier and heading stiffener wherein a female member is made integrally with a drapery-heading stiffener and is formed to provide a cavity between movable latch elements having catches which snap over and lock the lower end of the male member when the latter is properly located within the cavity.

The U.S. Pat. No. 3,878,589 issued Apr. 22, 1975 to Schaefer discloses a device for fastening two objects comprising a base plate with a cavity and an overhanging holder plate fastened to one object, and having a cylindrical stud with an overhanging flange fastened to the other object. The cavity, holder plate, stud, and flange are shaped so that the two objects must be oriented in a particular relation in order that the stud flange can be inserted in the cavity.

SUMMARY OF THE INVENTION

A primary feature of the present invention is to provide a blind attachment arrangement for mounting a vehicle plastic panel member to a juxtaposed plastic support surface in a flush, secure, high strength manner where an assembler has limited access thereto to make such an attachment.

It is another feature of the present invention to provide a blind attachment arrangement as set forth above wherein a flexible plastic panel member has a flange molded with a plurality of integral female connectors and the support has a planar surface molded with a plurality of male connectors adapted for mounting the plastic panel flange flush with the opposed support surface in a precise interlocking snap-in manner where an assembler has limited access thereto to make the attachment.

It is still another feature of the present invention to provide a blind attachment arrangement as set forth above for mounting a vehicle U-shaped resiliently flexible plastic fascia member, having right hand and left hand mirror image longitudinal panel sections to associated vehicle substructure plastic supports wherein both panel sections are attached in unison by an integral blind assembly arrangement.

The present invention discloses an arrangement for attaching a flexible panel member, such as plastic panel, to a planar substructure support surface of a vehicle body by means of a blind attaching arrangement. A downwardly facing undersurface of the substructure support is integrally molded with a uniform series of longitudinally spaced transversely staggered identical male connectors. That is to say the male connectors are progressively offset from front to rear whereby the second connector is offset in rank outboard from the first forward most male connector and so fourth.

Each of the male connectors comprises an airfoil-shaped stem formed symmetrical about its longitudinal axis. The stem has one upper end thereof integrally connected to a support undersurface and its lower end integrally connected to an overhanging backing plate parallel with the support undersurface. The undersurface and backing plate define a peripheral gap therebetween adapted to slidably receive the panel attaching flange therein. The airfoil-shaped stem has a leading half-round head portion and a trailing half-round tail portion interconnected by a pair of rearwardly converging tangent segments.

The resiliently flexible panel is formed with an attaching flange having its inboard longitudinal edge defined by a uniform series of female connectors comprising longitudinally spaced transversely offset cutting-tooth shaped notches formed in matching relation to the series of male connectors. Each cutting-tooth shaped notch comprises a rearwardly extending tooth body formed with an outer angled tooth flank and an inner angled tooth face. The tooth flank and the tooth face converge rearwardly and terminate in a rounded trailing tooth aft free end. Each angled tooth face and opposed coextensive angled flange edge define a forwardly converging passage having an aft lead-in entrance. The converging passage connects with a forwardly diverging locking groove terminating in a half-round forward flute.

To enable each female connector to be simultaneously moved rearwardly to engage its associated male connector the panel flange is positioned in flush relation with the substructure support surface with each female connector having the longitudinal centerline of its forwardly converging passage substantially coincident with the male connector longitudinal centerline. Blind engagement is achieved by initially moving the panel attachment flange along the support undersurface such that each notched inboard edge slidably enters respective male connector backing plate gap Upon the panel flange being slid rearwardly each stem leading half-round head portion is forced into its associated notch lead-in passage causing the tooth body to be resiliently flexed inboard enabling each stem head to be captured in its associated locking groove half-round flute in a snap-fitting manner. As a result the locking groove forwardly diverging sides are biased into wedging conforming engagement with their associated opposed forwardly converging stem segments whereby each stem is releasably secured in its notch locking groove. With the panel in its designed position a suitable fastener, such as a self tapping threaded screw or a headed push-in plastic retainers, may be used to anchor the panel flange to the substructure. It will be appreciated that an additional feature of the integral attaching arrangement of the present invention enables the ready removal of the plastic panel for repair or replacement.

BRIEF DESCRIPTION OF THE DRAWINGS

FIG. 1 is a fragmentary perspective view of a vehicle front end showing the location of a plastic facia panel adapted to be secured to a plastic body panel in accordance with the present invention;

FIG. 2 is a fragmentary exploded perspective view of a portion of a vehicle exterior plastic panel adapted to be installed on a vehicle body plastic fender in accordance with the present invention;

FIG. 3 is a fragmentary enlarged perspective view, with parts broken away, of the right hand exterior panel portion of FIG. 2 as it is installed on its associated right hand plastic fender;

FIG. 4 is a fragmentary vertical sectional view taken on the line 4—4 of FIG. 3;

FIG. 5 is a fragmentary elevational view taken in the direction of line 5—5 of FIG. 4;

FIG. 6 is a fragmentary longitudinal vertical sectional view, taken on the line 6—6 of FIG. 5;

FIG. 7 is a fragmentary transverse vertical sectional view taken substantially on the line 7—7 of FIG. 5;

FIG. 8 is a fragmentary horizontal sectional view taken on the line 8—8 of FIG. 7;

FIG. 8A is a detail horizontal cross sectional view of the male connector stem portion;

FIG. 9 is a fragmentary top elevational view of the right hand mounting shelf structure showing its subjacent U-shaped fascia member right attaching flange upper surface 69 initially positioned flush with the shelf structure undersurface 24 prior to the fascia member being moved rearwardly relative to its associated shelf structure;

FIG. 10 is a view similar to FIG. 9 showing the fascia member attaching flange after being moved rearwardly, relative to its associated shelf structure with each male connection attached to its associated female connector.

FIG. 11 is top elevational detail view of the U-shaped facia flexible elastomeric panel member;

FIG. 12 is a fragmentary exploded perspective view of a modified attaching arrangement of the present invention showing a single male connector and an associated female connector;

FIG. 13 is a fragmentary enlarged top elevational view showing the male connector and the female connector of FIG. 12 in their attached mode; and FIG. 14 is fragmentary exploded top elevational view of the male and female connectors of FIG. 12.

DESCRIPTION OF THE PREFERRED EMBODIMENTS

Turning now to the drawings, FIG. 1 shows a perspective view of a front portion of an automotive vehicle 10 having a body 12 that includes front right hand and left hand fenders formed of composite flexible material, generally indicated at 14-14. The fenders 14—14 are each connected to a lower exterior resiliently flexible molded fascia or panel member 16 which readily deflects under impact and thereafter springs back to its original configuration. It will be noted in the disclosed embodiment that the fascia member 16 is a "wraparound" U-shaped member, when viewed in the top elevation in FIG. 11. The U-shaped fascia member 16 comprises right hand and left hand longitudinally extending mirror image side panel sections 17 preferably molded integral with a transverse front section 18. The fascia member 16, symmetrically disposed about longitudinal axis "A" of the vehicle 10, has its transverse section 18 shaped for fitted support on an underlying bumper substructure (not shown).

With reference to FIG. 2 each fender 14—14 is formed from a suitable elastomeric or plastic material comprising a convex shaped exterior portion 19 and integral upper 20 and lower 22 horizontally disposed mounting shelf structure. The lower shelf support structure 22 has a planar undersurface 24 formed with a series of longitudinally spaced identical integrally molded male connectors. In the disclosed embodiment a forward male connector 30 and an aft male connector 31 are shown. As the male connectors 30 and 31 are identical the same reference numerals will be used in the description of the components of each.

As seen in FIGS. 3,6,8, and 9 each of the male connectors 30, 31 comprise a backing plate 32 integrally joined to the mounting support shelf structure undersurface 24 (FIG. 6) in spaced parallel relation by a vertically depending longitudinally elongated airfoil-shaped stem 34 in horizontal section formed symmetrical about male connector longitudinal major axes of symmetry indicated at 36 in FIG. 8A. Each stem 34 is defined by a leading half-round head portion 38, having a first predetermined radius of curvature R1, an intermediate body portion, and a trailing rounded aft portion 40, having a second predetermined radius of curvature R2. As seen in FIG. 8 the first radius of curvature R1 is a predetermined dimension larger than dimension of the second radius of curvature R2.

It will be noted in FIG. 8A that the stem leading half-round head portion 38 and rounded aft portion 40 are interconnected by an intermediate body portion defined by pair of planar angled tangent segments 42 converging rearwardly toward the rounded aft portion 40 at a predetermined included acute angle "X" of the order of 20 degrees. The elongated airfoil-shaped stem 34 provides added strength to the male connectors enabling the attaching arrangement to withstand both longitudinal forward and transverse side impacts of a predetermined level without failure.

As best seen in FIG. 3, each male connector backing plate 32 has its leading edge formed with a forwardly and downwardly angled lead-in lip 44 adapted to facilitate the sliding entry of right hand panel mounting or attaching flange 45 in a layer-like gap indicated by dimension line G in FIGS. 6 and 7. Each gap G is defined by backing plate inner surface 46 positioned in spaced parallel relation to the support structure shelf undersurface 24 sized to slidably receive in a snug fit manner the attachment flange 45 therebetween.

It will be noted in FIG. 9 that the longitudinal axes 36 of the leading and trailing male connectors 30,31 are offset a transverse dimension "Y" which dimension is slightly greater than the width of backing plates 32. That is the forward male connector 30 is offset inboard or staggered from the outboard aft male connector 31 for a reason to be explained.

With reference to FIGS. 2 and 11 forward and aft identical female connectors are shown at 50 and 51, respectively. In the following description the same reference numerals will be use for like or corresponding components. The female connectors are in the form of a series of cutting-tooth shaped notches formed in inboard opposed free edges 52 of each right and left panel section integral attaching flange 45. Each of the female connector notches 50 and 51 are defined by a rearwardly extending tooth body 56 having an inboard angled tooth flank 58 and an outboard angled tooth face 60. As best seen in the female connector 50 of FIG. 8, the tooth flank 58 and tooth face 60 are angled in a rearwardly converging manner and terminate in a rounded trailing free end 62.

FIG. 8 shows the angled tooth face 60 defining, with its associated opposed angled inboard notch edge 64, a female connector forwardly converging lead-in passage 65 communicating with a fluted retaining groove symmetrically disposed about its longitudinal axis of symmetry 66. Each female connector fluted retaining groove is defined by opposed forwardly diverging angled groove sides 67 intersecting their associated notch face 64 and tooth edge 60 at obtuse angle vertices or junctures Z, terminating in a forward half-round flute 68 adapted to receive an associated stem leading head portion 38 therein. It will be noted that the stem angled side segments 42 mate with their associated opposed angled diverging groove sides 67 in a matching or conforming wedged manner. As the attaching flange 45 is moved rearwardly relative to the male fore and aft connectors 30 and 31, each tooth portion 56 is resiliently flexed inboard by the camming action of its associated stem head portion 38.

In the disclosed embodiment the U-shaped fascia member 16 of FIG. 11 is preferably installed on an assembly line in a ready manner by attaching both the right and left side panel section attaching flanges 45 to their associated right and left fender support shelf structures 22—22 at the same time. It will be noted in FIG. 7 that each panel section flange 45 upper surface 69 is initially positioned flush with the undersurface 24 of its associated shelf structure 22 enabling fascia member right and left flange fore and aft female connectors 50, 51 to be moved longitudinally rearwardly. Such rearward movement allows the flanges 45 to be received in associated gaps G of each fore and aft male connector 30, 31 with each female connector converging lead-in passage 65 aligned with its associated male connector stem 34 enabling a blind assembly connection. The reason for the offset transverse dimension "Y" is to allow each right and left hand connector stem 34 to engage its associated female connector notches 50 and 51 at the same time. This occurs when conjointly securing each panel flange to an associated one of the support surfaces by positioning the U-shaped facia member in a horizontal plane with its axis of symmetry is aligned on the longitudinal axis "A" of the vehicle.

Upon each stem 34 being positioned as shown in FIG. 9 the U-shaped panel member 16 and its side sections 17—17 are moved aft relative to the vehicle body causing the right and left panel mounting flanges 45—45 to slide rearwardly in their associated gaps G. Such rearward travel of the U-shaped panel member results in each stem leading half-round head portion 38 being guided longitudinally into the notch lead-in passage defined by notch converging inboard edge 64 and its opposed tooth face 60. The forward travel of each stem half-round head portion 38 causes each tooth body 56 to be flexed inboard enlarging the lead-in passage. This enables each head portion 38 to be snugly releasably received in their associated locking groove conforming half-round flute 68 in a snap-in manner. With each male connector attached to its associated female connector each stem axis of symmetry 36 coincides with the female connector longitudinal axis of symmetry 66 such that each attaching flange upper surface 69 is drawn into abutting flush relationship with its respective support surface 24. It will be seen in FIG. 8 that applicant's arrangement provides effective wedging engagement between the stem converging side segments 42 and their respective confronting diverging locking groove sides 67. It will be noted in FIGS. 2 and 10 that a suitable fastening device, such as a single threaded self-tapping screw fastener F, is provided for reception in existing hole H (FIG. 2) to fixedly secure the attaching flange 45 to the support structure 22.

With reference to FIGS. 12, 13 and 14 there is shown male and female connectors 70 and 72, respectively, which represent an alternate embodiment of the male and female connector attaching arrangement of FIGS. 1-11. In the description of the embodiment of FIGS. 12, 13 and 14 like parts have the same reference numbers used in the description of FIGS. 1-11 except they are denoted by a prime.

In FIG. 13 the male connector 70 has a vertically depending longitudinally extending elongated keyhole-shaped stem 74 in horizontal section symmetrically disposed about a longitudinal axis of symmetry indicated by section line 14—14. The elongated keyhole-shaped stem 74 has a substantially three-quarter round (about 270 degrees) leading head portion 76 with a first predetermined radius R1', an intermediate body portion, and a substantially half-round (about 180 degree) curved aft portion 78 having a second predetermined radius R2'. The stem leading head portion 76 and trailing curved portion 78 are interconnected by the intermediate body portion defined by a pair of planar intermediate longitudinally extending parallel side segments 80.

As seen in FIG. 12 the male connector 70 has a backing plate 32' integrally joined to the mounting shelf structure undersurface 24' in spaced parallel relation by the stem 74 in the same manner as the backing plate 32 shown in FIGS. 1-10. The backing plate 32' is formed with a forwardly and downwardly angled lead-in lip 44' adapted to facilitate the sliding entry of its associated panel section support flange 45' in the backing plate gap having a predetermined dimension G'.

With reference to FIG. 13, each female connector 72' is in the form of a cutting-tooth shaped notch formed in inboard free edge 52' of each right and left panel section attaching flange 45'. Each of the female connector notches 72 forms a rearwardly extending tooth body 56' defined by an inboard angled tooth flank 58' and an outboard angled tooth face 60'. The tooth flank 58' and tooth face 60' are angled in a rearwardly converging manner and terminate in a squared-off or blunt trailing free end 62'. The angled tooth face 60' defines, with its associated opposed angled inboard notch edge portion 64', a forwardly converging lead-in passage 65' communicating with a fluted retaining groove adapted to receive in a snap-in manner the keyhole-shaped stem. The fluted stem retaining groove is symmetrically disposed about the longitudinal axis 66' and is defined by opposed forwardly diverging angled groove sides 67' terminating in a forward half-round flute 68'.

It will be noted that in the first embodiment of FIGS. 1-11, the stem 34 matches the shape of its associated retaining groove so as to positively lock the male connector 30 in the female connector 50. As both the male connector 30 and the female connector 50 are formed of the same elastomeric material of similar thicknesses, the rate of thermal expansion and contraction of the connectors are substantially equal allowing for their positive locked connection.

In the second embodiment of this invention, the retaining groove of the female connector 72 receives the keyhole-shaped stem in a snap-in manner while providing for predetermined longitudinal movement of the attachment flange 45' relative to the support structure 22'. Thus, the obtuse angle vertices or opposed junctures Z are spaced a predetermined distance less than the diameter of the head portion 76 causing snap-in retention of the stem 74. This embodiment, however, allows controlled longitudinal travel of the attachment flange 45' relative to the support structure 22' by virtue of arcuate tolerance space S provided between the head portion 76 and the fluted retaining groove defined by diverging sides 67' and half-round flute 68'. It will be appreciated that the arcuate three-quarter round tolerance space S is shown enlarged in FIGS. 13 and 14 for the purposes of illustration.

The longitudinal travel of the U-shaped fascia member 16 relative to the vehicle fenders 14—14 permits the assembly line installer to make longitudinal alignment corrections prior to driving self-tapping fastener F upwardly through attaching hole flange H for self-tapping engagement of the shelf support structure 22. As the area of attachment of the fascia member 16 to the fender support structure 22 is not accessible to the installer, applicants' unique blind connection is required. It will be understood that the installation of the fastener F is possible only because the adjacent front wheel well allows access to the rearward end portion of the support flange 45.

As in the first embodiment, the elongated keyhole-shaped stem 74 provides increased structural strength with the structural member 22' whereby the attaching arrangement is capable of withstanding both longitudinal forward and transverse side impacts of a predetermined designed level without failure.

While a preferred embodiment has been shown and described to illustrate the invention, other embodiments will become to those skilled int he art. Accordingly, the scope of his invention is set forth in the following claims.

What is claimed is:

1. In combination with an automobile vehicle body having fore and aft ends and a pair of longitudinally extending laterally spaced apart horizontally disposed planar support undersurfaces, a flexible elastomeric U-shaped member comprising right and left longitudinally extending mirror image side panel sections molded integrally with a transverse section for fitted support on an underlying bumper substructure at one said end of the vehicle body, each said side panel sections formed with an integral horizontally disposed flange having opposite upper and lower planar surfaces and an inboard longitudinal edge portion, each said panel flange of predetermined thickness adapted to be supported with its one planar surface is flush abutment with an associated one of said support undersurfaces, a blind connecting arrangement for securing each said U-shaped member side panel flange upper surface to an associated one of said support undersurfaces by positioning said U-shaped member in a substantially horizontal plane such that it is adapted to be affixed at one end of said vehicle with said U-shaped member having its principal axis of symmetry thereof aligned on a longitudinal extending vertically disposed plane which includes the vehicle longitudinal axis whereby said assemblers having limited access to said support surfaces;

said one support undersurface having at least a pair of forward and an aft identical male connectors arranged thereon in mirror image relation with a pair of forward and aft male connectors on the other support undersurface, each said forward and aft male connector in the form of a vertically depending stem providing upper and lower opposite ends with its one upper end integrally connected to its associated support undersurface and its lower end integrally connected to one inner surface of a horizontally disposed backing plate, each said backing plate inner surface in predetermined spaced parallel relation to its associated support undersurface so as to define a layer-like gap therewith adapted to slidably receive a portion of an associated one of said U-shaped member side panel flanges therein;

each said stem having an elongated shape in horizontal section formed symmetrical about its major longitudinal axis such that each said forward male connector major axis is offset inboard a predetermined dimension from its associated aft male connector major axis, each said stem defining a leading semi-circular head portion with a predetermined radius of curvature, an intermediate body portion defined by a pair of opposite planar side segments, and a trailing aft portion, each said backing plate having a predetermined lateral extent such that it overhangs its associated stem side segments;

each said U-shaped member side panel flange molded with at least a pair of forward and aft an aft female connectors in opposed mirror image relation with a pair of forward and aft female connectors on the other U-shaped member flange, each said female connector in the form of a cutting-tooth shaped notch providing an angled notch edge portion, each said cutting-tooth shaped notch comprising a rearwardly extending tooth body defined by an inboard angled tooth flank and an outboard angled tooth face with said tooth flank and tooth face converging rearwardly so as to terminate in a tooth body trailing free end thereof, each said angled tooth face in opposed spaced relation with its associated angled notch edge portion defining therewith a forwardly converging lead-in passage;

each said lead-in passage communicating with a forward fluted locking groove defined by opposed forwardly diverging angled groove sides terminating in a half-round flute symmetrically disposed about a longitudinal axis thereof, such that each said forward fluted female locking groove having a longitudinal axis of symmetry offset inboard from its associated aft female locking groove longitudinal axis of symmetry a predetermined dimension equal to said male connector offset inboard predetermined dimension, each said female connector locking groove having a shape adapted to lockingly receive an associated stem leading head portion; and whereby conjoint engagement of each said male connector by an associated one of said female connectors is achieved by initially contacting and moving each said U-shaped member side panel flange upper surface longitudinally relative to an associated one of said support undersurfaces causing each said U-shaped member side panel flange to be received in an associated layer-like gap, wherein subsequent reward travel of said U-shaped member resulting in each said stem leading head portion being guided into an associated side panel flange lead-in passage and resiliently flexing each said tooth body laterally enabling each said stem leading head portion thereof to be received in an associated locking groove in a snap-in releasably lockable manner, such that each said female connector is releasably connected to an associated male connector with each said side panel flange upper surface retained in flush abutting contact with its associated support undersurface.

2. In the connecting arrangement as set forth in claim 1, wherein each said male connector stem being airfoil-shaped in horizontal section defined by a leading half-round head portion having a first radius of curvature, an intermediate body portion, and a trailing aft portion having a second radius of curvature a predetermined dimension less than said first radius of curvature, said intermediate body portion defined by a pair of planar angled tangent side segments converging rearwardly at a predetermined included acute angle; and said each locking groove in the form of a fluted locking groove defined by opposed forwardly diverging angled groove sides terminating in a forward half-round flute whereby said retaining groove matches said stem head and side segments so as to be snugly received therein in positive locked engagement.

3. In the connecting arrangement as set forth in claim 1, wherein each said stem being keyhole-shaped in horizontal section defined by a leading three-quarter round head portion having a first radius of curvature, an intermediate body portion, and a trailing aft portion having a second radius of curvature a predetermined dimension less than said first radius of curvature, said intermediate body portion defined by a pair of planar substantially parallel side segments; and each said locking groove in the form of a fluted locking groove defined by opposed forwardly converging angled groove sides terminating in a forward half-round flute having a radius of curvature sized to conform in a spaced manner with an associated stem head portion received therein.

4. In the connecting arrangement as set forth in claim 1, wherein each said backing plate leading edge is formed with a forwardly and downwardly angled lead-in lip adapted to facilitate sliding entry of its associated U-shaped member side panel flange.

* * * * *